Figure 4:
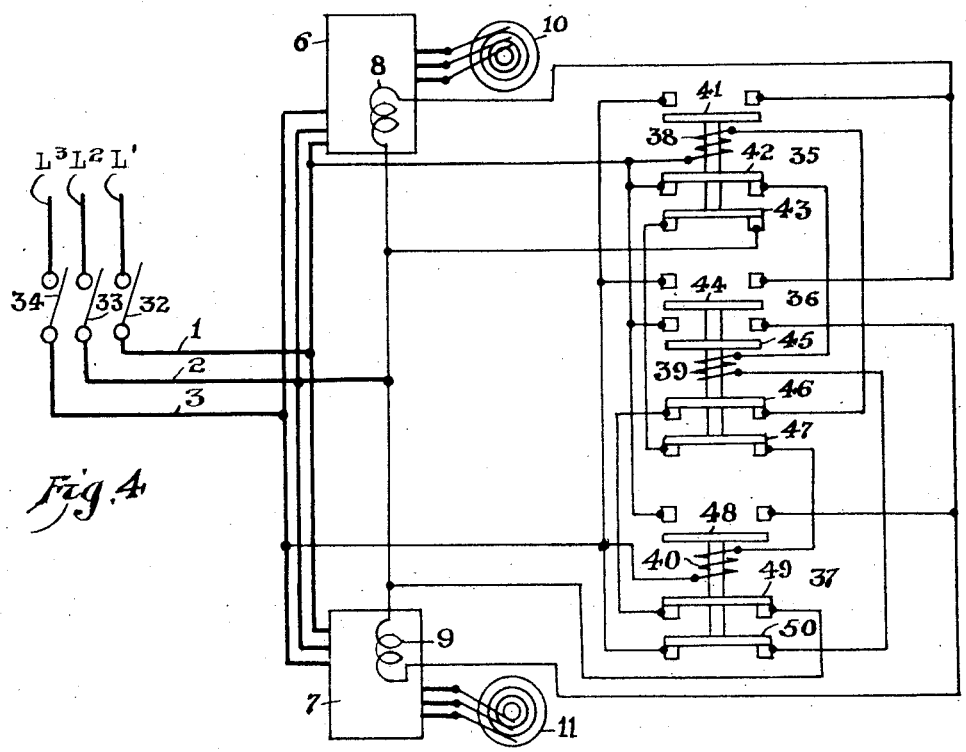

Aug. 6, 1929.　　　W. R. YORKEY　　　1,723,755
POLYPHASE MOTOR CONTROL SYSTEM
Filed Sept. 16, 1925　　2 Sheets-Sheet 1
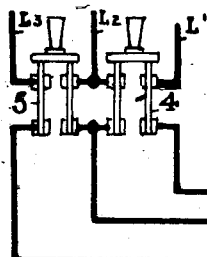
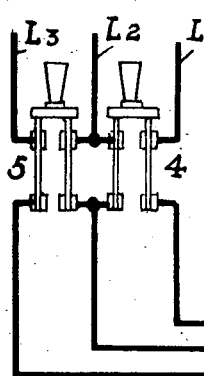
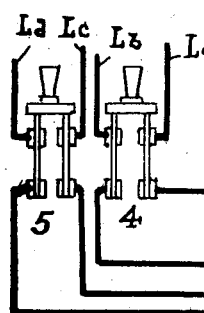
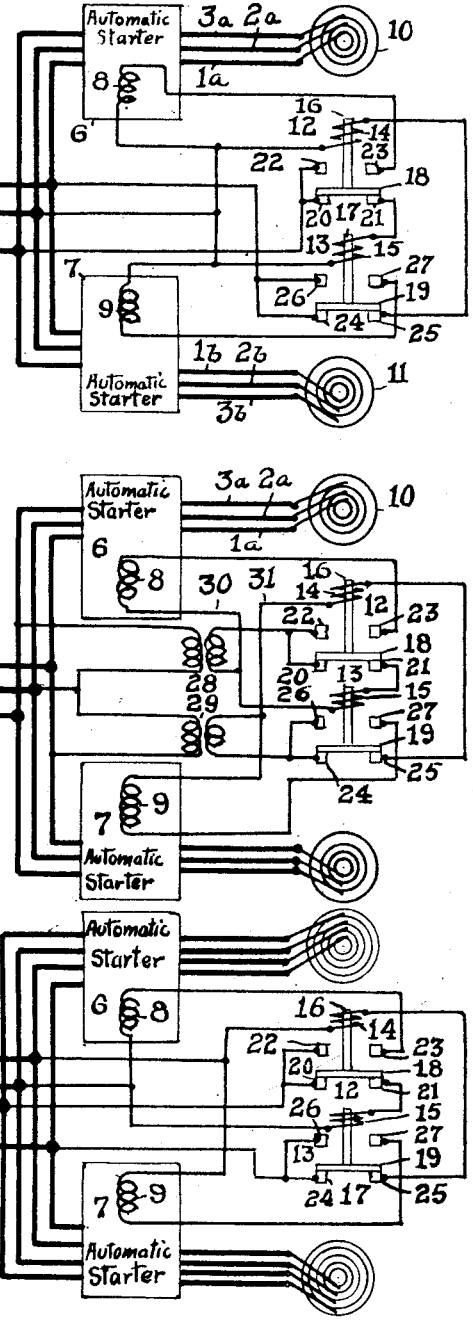
INVENTOR.
W. R. Yorkey
BY
F. N. Barber
ATTORNEY.

Aug. 6, 1929.  W. R. YORKEY  1,723,755
POLYPHASE MOTOR CONTROL SYSTEM
Filed Sept. 16, 1925  2 Sheets-Sheet 2

INVENTOR
W. R. Yorkey
by F. N. Barber
attorney

Patented Aug. 6, 1929.

1,723,755

UNITED STATES PATENT OFFICE.

WILLIAM R. YORKEY, OF EAST ORANGE, NEW JERSEY, ASSIGNOR TO THE ELECTRIC CONTROLLER & MANUFACTURING COMPANY, OF CLEVELAND, OHIO, A CORPORATION OF OHIO.

POLYPHASE-MOTOR-CONTROL SYSTEM.

Application filed September 16, 1925. Serial No. 56,730.

My invention relates to systems for controlling two polyphase motors.

In some installations, especially pump installations, two electric motors are provided, one being a stand-by for the other, so that continuous motor service may be ensured. In many cases the motors are installed at considerable distances from the points at which their manually-operated controlling devices are located. The cost of installing extra wires and starting devices for selective remote control of either of the two motors is large. It is the principal object of this invention to provide for the operation of either of two polyphase motors on a polyphase circuit by utilizing no wires other than the power leads employed for conducting motor-operating current from the point of control to the motor starters. It is also an object of my invention not only to operate any one of a number of such motors, but also to operate all the motors at the same time, as the operator may desire.

My invention embodies also the details and their combinations as hereinafter described and claimed.

The accompanying drawing shows diagrammatically in the five figures thereon five of the many systems by which this invention may be utilized.

Referring first to Fig. 1, which represents a 3-wire system for two 2-phase or two 3-phase motors, 1, 2 and 3 are the three power leads, connectible respectively to the current-supply lines $L'$, $L^2$ and $L^3$ by the switches 4 and 5, the former adapted to connect the lines $L'$ and $L^2$ to the leads 1 and 2 respectively, and the latter being adapted to connect the lines $L^2$ and $L^3$ to the leads 2 and 3 respectively. 6 and 7 are automatic or electromagnetic starters of any suitable type having respectively the actuating coils 8 and 9 for the respective alternating current motors 10 and 11.

12 and 13 are electromagnetic relays for the respective starters 6 and 7 and have the operating coils 14 and 15 whose armatures 16 and 17 operate the switch contacts 18 and 19 carried thereby. The contact 18 engages its lower contacts 20 and 21 when the coil 14 is without current, and its upper contacts 22 and 23 when it is supplied with current sufficient to lift the armature 16. The contact 19 engages its lower contacts 24 and 25 when the coil is unenergized, and its upper contacts 26 and 27 when it is energized sufficiently to lift the armature 17. The contacts 20 and 22 are connected to the lead 3, and the contacts 24 and 26 to the lead 1. The contact 23 is connected to one end of the coil 8 and the contact 27 is connected to one end of the coil 9. The remaining ends of the coils 8 and 9 are connected together and to the lead 2 and to one end of each of the coils 14 and 15. The remaining end of the coil 14 is connected to the contact 25, and the remaining end of the coil 15 to the contact 21.

The leads 1, 2 and 3 have each two branches leading to the starters 6 and 7, from which the feed-wires $1^a$, $2^a$ and $3^a$, and $1^b$, $2^b$ and $3^b$ run to the motors 10 and 11.

The electromagnetic devices 12 and 13 are shown as single-phase relays, but in practice they can be relays, pilot motors or other electromagnetic means. The starters 6 and 7 are not shown in detail, as their specific construction forms no part of this invention. They may be automatic compensators for squirrel-cage motors, or automatic controllers for slip-ring motors.

If it is desired to start the motor 10, the switch 4 is first closed, whereupon the leads 1 and 2 are excited, the circuit being through the line $L'$, the lead 1, the contacts 24 and 25, the coil 14, the lead 2 and the line $L^2$. The current in this circuit energizes the coil 14 which causes the contact 18 to leave the contacts 20 and 21 and bridge the contacts 22 and 23. If now the switch 5 is closed, a circuit is established through the line $L^2$, the lead 2, the coil 8, the contacts 23, 18 and 22, and the lead 3 to the line $L^3$. The coil 8 being energized causes in a manner well known the actuation of the starter 6 and the acceleration of the motor 10. Upon opening the switches 4 and 5 the coils 8 and 14 are deprived of current, whereupon the starter 6 resumes its idle position, the contact 18 drops to close the contacts 20 and 21, and the motor 10 stops.

If it is desired to operate the motor 11, the switch 5 is first closed, current in the leads 2 and 3 then flowing through the coil 15 by way of the contacts 20, 18 and 21. The current in the coil lifts the contact 19 against the contacts 26 and 27. The switch 4 is then closed, so that current in the leads 1 and 2 flows through the coil 9, causing the starter 7 to operate and the motor 11 to be accelerated in a well known manner. The motor is stopped as before by opening the switches 4 and 5.

In Fig. 2, the system is shown modified for use with high voltage current where it is advisable to use low voltage current on the control circuits of the starters 6 and 7. The system of Fig. 2 is that of Fig. 1 modified in the manner now to be stated. Two voltage reducing transformers 28 and 29 are provided. One terminal of the primary of each transformer is connected to the lead 2. The remaining end of the primary of the transformer 28 is connected to the lead 3, and the remaining terminal of the primary of the transformer 29 is connected to the lead 1. The secondary of the transformer 28 has one terminal connected to the contacts 20 and 22, and the secondary of the transformer 29 has one terminal connected to the contacts 24 and 26. The remaining terminal of the secondary of the transformer 28 is connected to the wire 30 which connects the coils 8 and 15, and the remaining terminal of the secondary of the transformer 29 is connected to the wire 31 which connects the coils 9 and 14.

The closure of the switch 4 causes the transformer 29 to be energized and current to flow through the coil 14 by way of the contacts 24, 19 and 25. The current in the coil 14 causes the contact 18 to close on the contacts 22 and 23, which places the coil 8 in a closed circuit with the secondary of the transformer 28. If the switch 5 is now closed, the transformer 28 is energized, its secondary supplying current to the coil for operating the starter 6 as in the case of Fig. 1. The motor is accelerated in the usual manner. By opening the switches 4 and 5, the starter 6 and the relay 12 return to their inactive positions.

To start the motor 11, the switch 5 is first closed, whereupon the transformer 28 is energized, whereupon the relay 13 is operated. Upon closing the switch 4, the coil 9 is energized by current from the transformer 29 flowing through the contacts 26, 19 and 27.

In Fig. 3, the system is adapted to a 2-phase 4-wire circuit operating two 2-phase 4-wire motors. The leads $1^x$ and $2^x$ carry one phase and the leads $2^y$ and $3^x$ the other, the switch 4 connecting the first pair of leads to single phase lines $L^a$ and $L^b$, and the switch 5 connecting the second pair of leads to the single phase lines $L^c$ and $L^d$. The four leads have each a branch leading to the starters 6 and 7. The system of Fig. 3 is like that of Fig. 1 except in the use of four leads instead of three, and except in the connection of the coils 8, 9, 14 and 15 to the source of current. The leads $1^x$ and $3^x$ have the same connections to the electromagnetic devices 12 and 13 as the leads 1 and 2 in Fig. 1 have. The common connections which the lead 2 has in Fig. 1 with the devices 12 and 13 are divided in Fig. 3, the lead $2^x$ being connected to the coils 9 and 14, and the lead $2^y$ to the coils 8 and 15.

To start the motor 10, the switch 4 is first closed. Current flows through the coil 14 and the contacts 24, 19 and 25. Current in the coil 14 causes the contact 18 to bridge the contacts 22 and 23 so that the coil 8 is placed in the circuit of the leads $2^y$ and $3^x$. The switch 5 is now closed, whereupon current is supplied to the coil 8, and the motor 10 is started as in the case of Fig. 1.

To start the motor 11, the switch 5 is first closed and then the switch 4 is closed. In this case the coil 15 is energized and the contact 19 is operated to bridge the contacts 26 and 27, whereby the coil 9 is placed in the circuit of the leads $1^x$ and $2^x$.

In Fig. 4, I show a system by which either or both motors may be started at the will of the operator. The leads 1, 2 and 3 are connectible to the power lines $L'$, $L^2$, and $L^3$ by the three separate switches 32, 33 and 34. There are three relays 35, 36, and 37 having actuating coils 38, 39 and 40. The relay 35 has three sets of contacts 41, 42 and 43. When the circuit of the coil 38 is open the two lower sets of contacts 42 and 43 are closed and the upper set of contacts 41 are open; and when the coil 38 is fully energized the upper contacts are closed and the lower contacts are opened.

The relay 36 has two upper sets of contacts 44 and 45 and two lower sets of contacts 46 and 47, the former set being open and the latter sets closed when the coil 39 is in open circuit, and the former being closed and the latter open when the coil is in closed circuit.

The relay 37 has one upper set of contacts 48 and two lower sets of contacts 49 and 50, the contacts 48 being open and the contacts 49 and 50 being closed when the circuit of the coil 40 is open, and the contact 48 is closed and the contacts 49 and 50 are open when the coil 40 is fully energized.

If it is desired to start the motor 10, the switches 32 and 33 are closed, whereupon the coil 38 is energized by current through the line $L'$, the switch 32, the lead 1, the contacts 46 and 49, the lead 2, the switch 33 and the line $L^2$. Current in the coil 38 causes the contacts 41 to close and the contacts 42 and 43 to open so as to prevent the coils 39 and 40 from getting current. The contacts 41 connect the actuating coil 8 of starter 6 in circuit with the lead 3. If now the switch 34 is closed the circuit of the coil 8 will be completed and the motor 10 started.

If it is desired to start the motor 11, the switches 33 and 34 are closed, whereupon a circuit through the lines 2 and 3, the coil 40 and the contacts 47 and 43 is established. The current in the coil 40 causes the contacts 48 to be closed and the contacts 49 and 50 to be opened, so that the coils 38 and 39 may not receive current. If now the switch 32 is closed, current will flow through the leads 1 and 2, the coil 9 and the contacts 48, and the starter 7 will be operated to start the motor 11.

If it be desired to start both motors, switches 32 and 34 are first closed, whereupon current will flow through the line L', the switch 32, the lead 1, the contacts 42, the coil 39, the contacts 50, the lead 3, the switch 34 and the line L³. The current in the coil 39 operates the relay 36 to close its upper contacts 44 and 45, and open its lower contacts 46 and 47. The latter two sets of contacts being open, the coils 38 and 40 can not receive current. If now the switch 33 is closed, the coil 8 will be energized by current through the leads 2 and 3 and the contacts 44 and the coil 9 will be energized by current through the leads 1 and 2 and the contacts 45. The current in the coils 8 and 9 causes both starters to operate and consequently both motors to start.

At closure of switches 32 and 34 current also runs through coils 38 and 40 in series from lead 1 through the coil 38, the contacts 46, 49, 43 and 47, and the coil 40 to the lead 3, but they are so designed that they will not operate on one-half voltage.

The system just described is applicable to three-phase three-wire motors.

Figure 5:
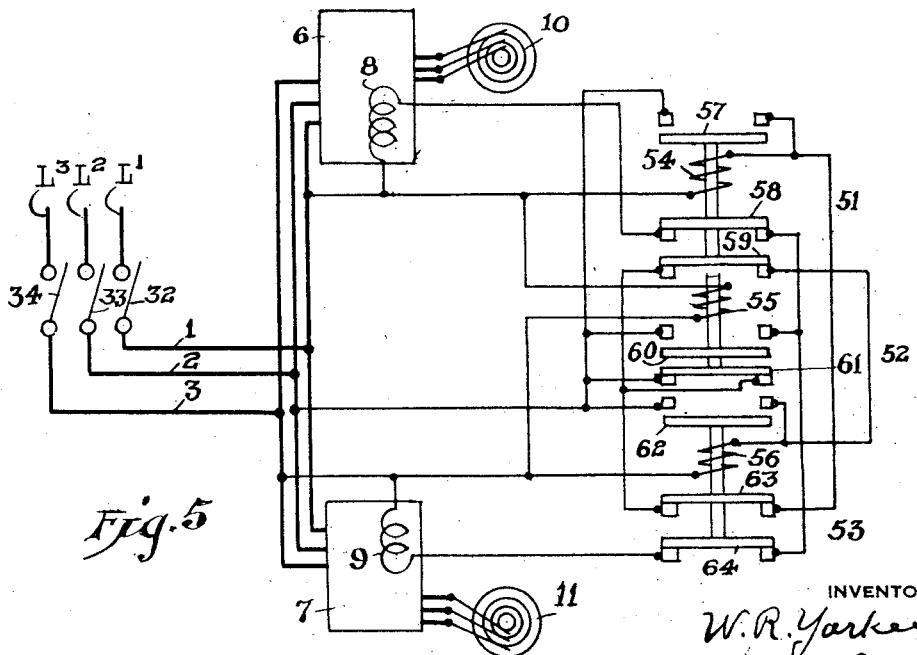

In Figure 5, the same results are obtained as in Figure 4, but with slightly different connections and fewer sets of contacts on the relays. The coil 54 for the relay 51 controls the three sets of contacts 57, 58 and 59; set 57 being open and the sets 58 and 59 closed when the coil 54 is unenergized or partly energized, and the set 57 is closed and sets 58 and 59 are opened when coil 54 is fully energized. The coil 55 of relay 52 controls two sets of contacts 60 and 61, set 60 being open and set 61 being closed when coil 55 is unenergized, but set 60 is closed and set 61 is opened when coil 55 is energized. The coil 56 of relay 53 controls three sets of contacts, 62, 63 and 64 similar to contacts 57, 58 and 59 of relay 51.

To start motor 11, the switches 32 and 33 are closed, whereupon the coil 54 is energized by current flowing thru the line L', the switch 32, the lead 1, the contacts 63 and 61, the lead 2, the switch 33 and the line L². The contacts 58 and 59 open and contacts 57 close, thereby opening the circuits of coils 8 and 56 and providing another circuit for coil 54 from line L¹, switch 32, lead 1, contacts 57, lead 2, switch 33, and line L². If now the switch 34 is closed, the coil 55 of relay 52 receives current from leads 1 and 3. The relay 52 now operates and closes its contacts 60 and opens its contacts 61. The coil 9 is supplied with current thru the lead 3, the contacts 64 and 60, and the lead 2 and causes actuation of the starter 7 and the motor 11.

To start motor 10, the switches 33 and 34 are first closed, whereupon the relay 53 is operated to open its contacts 63 and 64 and close its contacts 62, so that coils 9 and 54 can not receive current and to provide another circuit for coil 56. The switch 32 is then closed, whereupon relay 52 is operated as before, so that coil 8 is placed in a closed circuit thru the lead 1, the contacts 58 and 60, and the lead 2. The starter 6 is operated by the coil 8 and the motor 10 starter.

To start both motors, the switches 32 and 34 are first closed, which places coil 55 in circuit with the lines L' and L³. The current in the coil 55 causes the contacts 60 to close and the contacts 61 to open, thereby connecting the coil 8 in circuit of leads 1 and 2, and the coil 9 in the circuit of the leads 2 and 3. If now switch 33 is closed the circuits of both the coils 8 and 9 will be completed and both motors 10 and 11 will be started. When switches 32 and 34 are closed, coils 54 and 56 receive current from the lead 1, the coil 54, the contacts 63, the contacts 59, and the coil 56 to the lead 3, but the coils are designed so as not to operate on one-half voltage.

I claim—

1. In a polyphase motor control system, two electricity-consuming means, an electromagnetic device for each means, connections whereby the energization of one device effects the operation of one of the means and the energization of the other device effects the operation of the other means, switches for controlling the devices, and means including connections whereby the particular phase first connected in circuit by certain of the switches selectively determines which device will be energized and consequently which means will consume current and whereby the closure of the remaining of the switches causes the circuit of the winding of the selected electromagnetic device to be closed.

2. In a polyphase motor control system, two electricity-consuming means, a source of polyphase current, leads supplying current to the means, an electromagnetic device for each means, means including connections whereby the energization of one device effects the operation of one of the means and the energization of the other device effects the operation of the other means, switches for connecting the source to the leads, and connections including the leads whereby one electromagnetic device or the other is selected for energization according to the phase first connected in circuit by certain of the switches and whereby the closure of the remaining of the switches causes the circuit of the winding of the selected electro-magnetic device to be closed.

3. In a polyphase motor control system, two polyphase motors, leads thereto, an electromagnetic circuit closing device for the circuit of each motor, switches connecting the said devices to a source of polyphase current, and means whereby the operation of certain of the switches to connect one phase in circuit first makes one of said devices effective to connect simultaneously all phases of its respective motor to the said polyphase source when the remainder of the phases is closed, and the operation of certain of the switches to connect a different phase in circuit first makes the other of said devices effective to connect simultaneously all phases of its respective motor to the said polyphase source when the remainder of the phases is closed.

4. In a polyphase motor control system, two polyphase motors, a polyphase power-supply circuit therefor, an electromagnetic circuit closer for each motor, two single-phase electromagnetic devices operable by different phases, means whereby each device when operated closes a circuit through the operating coil of its respective circuit closer, means for closing one phase of the power supply circuit prior to closing the other phase, and means whereby the closing of one phase first rather than another selects the device to be operated and whereby the closure of the remainder of the switchs causes the circuit of the winding of the selected device to be closed.

5. In a polyphase motor control system, two polyphase motors, a polyphase power-supply circuit therefor, means for closing either phase of the power-supply circuit prior to closing another phase, an electromagnetic circuit closer for each motor, single-phase electromagnetic devices having their operating coils connected to be energized by different phases of the said circuit, connections whereby, when one phase is closed, the operating coil of one device is energized and the operating coil of the other device is disconnected from the said circuit, and connections whereby, when the other phase is subsequently closed, a circuit is closed through the operating coil of the remaining of the circuit closers.

6. In a polyphase motor control system, two polyphase motors, two electromagnetic circuit-closing devices for said motors, each device having an actuating coil, a polyphase power supply circuit, means for closing either phase of said polyphase power supply circuit prior to closing the other phase, a single-phase electromagnetic means, connections whereby closure of one phase of the power supply circuit will actuate the electromagnetic means, and closure of the other phase of the power supply circuit will excite the actuating coil of one of said circuit closing devices through contacts on the electromagnetic means, a second single-phase electromagnetic means, connections whereby closure of second phase of the power supply circuit prior to closure of the first phase will cause this electromagnetic means to operate and closure of the first phase of the power supply circuit will excite the actuating coil of the other of said circuit closing devices through contacts on the second electromagnetic means.

7. In a polyphase motor control system, two three-phase three-wire translating devices, polyphase current supply lines, leads for the translating devices, means for connecting each lead separately to the above mentioned polyphase supply lines, and means whereby one translating device or the other or both are supplied with current according to which lead is first connected to its supply line.

8. In a polyphase motor control system, two three-phase three-wire translating devices, polyphase current supply lines, leads for the translating devices, means for connecting each lead separately to the above mentioned polyphase supply lines, and means whereby the connection of one lead to its supply line made after the other two leads have been connected to their supply lines causes one translating device to receive current; the connection of another lead to its supply line after the other two leads have been connected to their supply lines, causes the other translating device to receive current, and the connection of the third lead to its supply line after the other two leads have been connected to their supply lines, causes both translating devices to receive current.

9. In a polyphase current control system, two polyphase translating devices, polyphase current supply lines for the said devices, and means for selectively connecting one or the other or both of the said devices to the supply lines, the selectivity depending upon which phase is first closed.

10. In a polyphase current control system, two polyphase translating devices, polyphase current supply lines for the said devices, and means for selectively connecting one or the other or both of the said devices to the supply lines, the selectivity depending upon which phase is first closed, and the said connecting of one or the other or both of the said devices requiring the closing of all the phases.

11. In a polyphase current control system, two polyphase translating devices, polyphase current supply lines, leads for the said devices, switches for connecting some of the lines to some of the leads, and means whereby selective sequence of the operation of the switches causes operative connection of one or the other or both of the said devices to the supply lines.

12. In a polyphase motor control system, two electricity-consuming means, an electromagnetic device for each means, means actuated upon the closing of the circuit of one phase, for ensuring the energization of the winding of one of the said devices when the circuits of all the phases are subsequently closed, and for preventing the energization of the winding of the other device.

13. In a polyphase system, two electricity-consuming means, electro-responsive means actuated upon the closing of the circuit of one phase of the said system for insuring the simultaneous energization of all phases of one of the said electricity-consuming means when the circuits of all the phases of said system are substantially closed and means for preventing the energization of the other of the said electricity-consuming means.

In testimony whereof I hereunto affix my signature.

WM. R. YORKEY.